J. W. McKAY.
SMOKING-PIPE.
No. 176,662. Patented April 25, 1876.
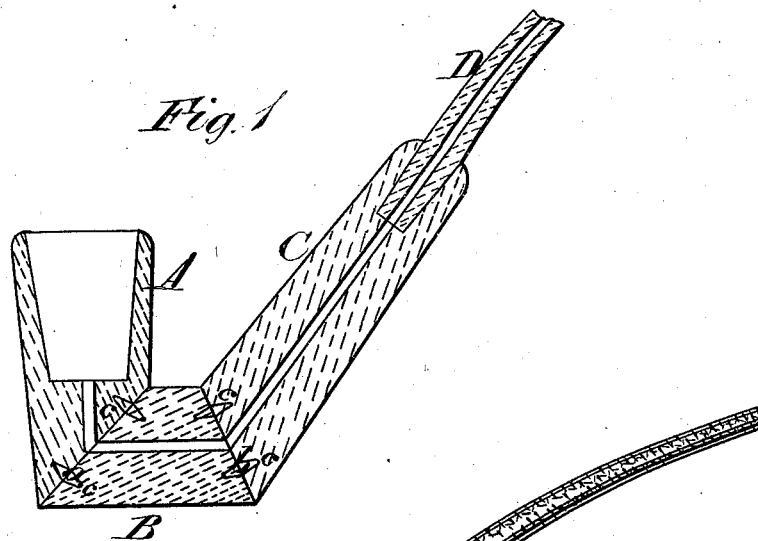
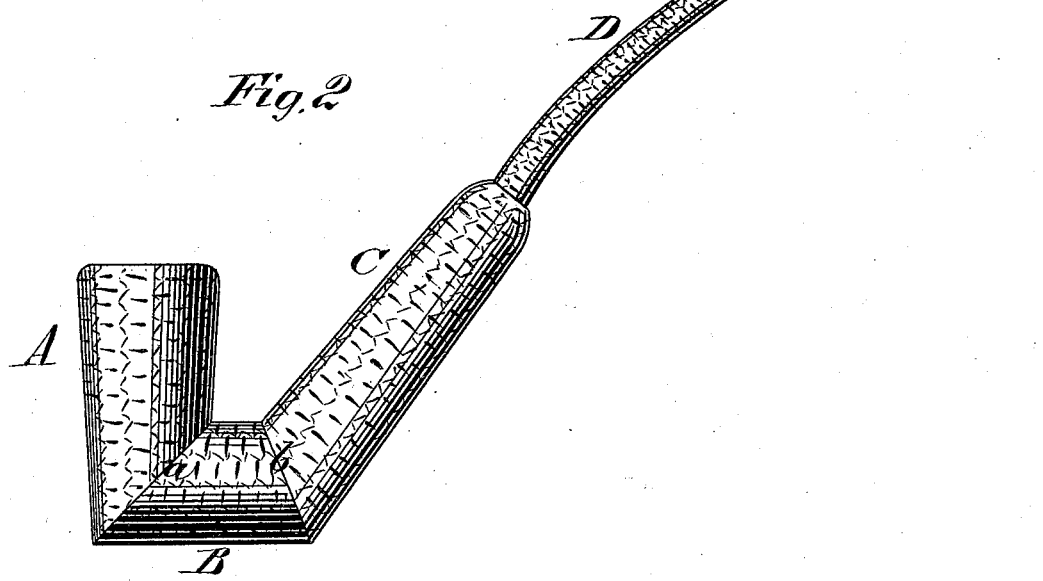
WITNESSES
INVENTOR
ATTORNEYS

UNITED STATES PATENT OFFICE.

JOHN W. McKAY, OF CAVERNA, KENTUCKY.

IMPROVEMENT IN SMOKING-PIPES.

Specification forming part of Letters Patent No. 176,662, dated April 25, 1876; application filed February 26, 1876.

*To all whom it may concern:*

Be it known that I, JOHN W. McKAY, of Caverna, in the county of Hart and State of Kentucky, have invented a new and valuable Improvement in Jointed Corn-Cob Pipes; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical central section of my pipe, and Fig. 2 is a side view thereof.

This invention has relation to smoking-pipes; and the nature of my invention consists in a corn-cob pipe, which is made up of mitered sections secured together by dowel-pins and cement, as will be hereinafter explained.

In the annexed drawings, A designates the bowl of the pipe, B the base thereof, C the shank or socket piece, and D the stem. The three parts A, B, and C are made of corn-cobs, and the stem D is of "pop"-corn cob. These pieces are neatly trimmed, given the required shape, and bored out. At $a$ $b$ the three pieces A B C are secured together, the joints being formed in a miter-box, and secured together by dowel-pins $c$ and any suitable cement. Previous to securing the sections of the pipe together I saturate them in a solution of saltpeter, which prevents them from rapidly burning out. By mitering the sections of the cobs at different angles pipes of various forms can be made.

I am well aware that pipes have heretofore been made of corn-cobs, and. I therefore lay no claim to such invention broadly; but

What I claim as new, and desire to secure by Letters Patent, is—

The new and improved article of manufacture, to wit: a corn-cob pipe, made of mitered sections A B C, secured together substantially as described.

In testimony that I claim the above I have hereunto subscribed my name in the presence of two witnesses.

JOHN WILLIAM McKAY.

Witnesses:
T. H. PEMBERTON,
S. W. MITCHELL.